United States Patent
Belli et al.

(10) Patent No.: US 6,176,553 B1
(45) Date of Patent: Jan. 23, 2001

(54) WHEEL, PARTICULARLY FOR ROLLERS SKATES

(75) Inventors: Nicola Belli, Marghera; Alfio Mogno, Montebelluna, both of (IT)

(73) Assignee: Benetton Group S.p.A., Ponzano Veneto (IT)

(*) Notice: Under 35 U.S.C. 154(b), the term of this patent shall be extended for 0 days.

(21) Appl. No.: 09/323,111

(22) Filed: Jun. 1, 1999

(30) Foreign Application Priority Data

Jun. 3, 1998 (IT) ............................................... TV98A0088

(51) Int. Cl.⁷ ...................................................... B60C 7/00
(52) U.S. Cl. ........................... 301/5.3; 152/326; 152/523; 152/209.16; D12/152
(58) Field of Search .................. 301/5.3, 5.7; 280/11.19, 280/11.22, 11.23; 152/323, 324, 325, 326, 209.3, 209.8, 209.11, 209.16, 523; D12/152

(56) References Cited

U.S. PATENT DOCUMENTS

| | | | |
|---|---|---|---|
| 1,499,276 | * 6/1924 | Williams | 152/523 X |
| 1,662,007 | * 3/1928 | Kuhlke | 152/326 X |
| 1,670,827 | * 5/1928 | Seiberling | 152/326 |
| 2,592,557 | * 4/1952 | Gibbs | 152/209.16 |
| 4,364,426 | 12/1982 | Mills et al. | 152/209 R |
| 5,346,231 | * 9/1994 | Ho | 280/11.22 X |

FOREIGN PATENT DOCUMENTS 4-254205    9/1992    (JP).

* cited by examiner

Primary Examiner—Russell D. Stormer
(74) Attorney, Agent, or Firm—Guido Modiano; Albert Josif; Daniel O'Byrne

(57) ABSTRACT

A wheel for skates comprises a hub which is rotatably associable with a pivot and with which a tread is associated. A plurality of grooved regions are formed in the lateral surfaces of the tread and run gradually toward the median plane of the tread, so as to allow optimum stability when the lateral inclination assumed by the skate increases.

5 Claims, 2 Drawing Sheets

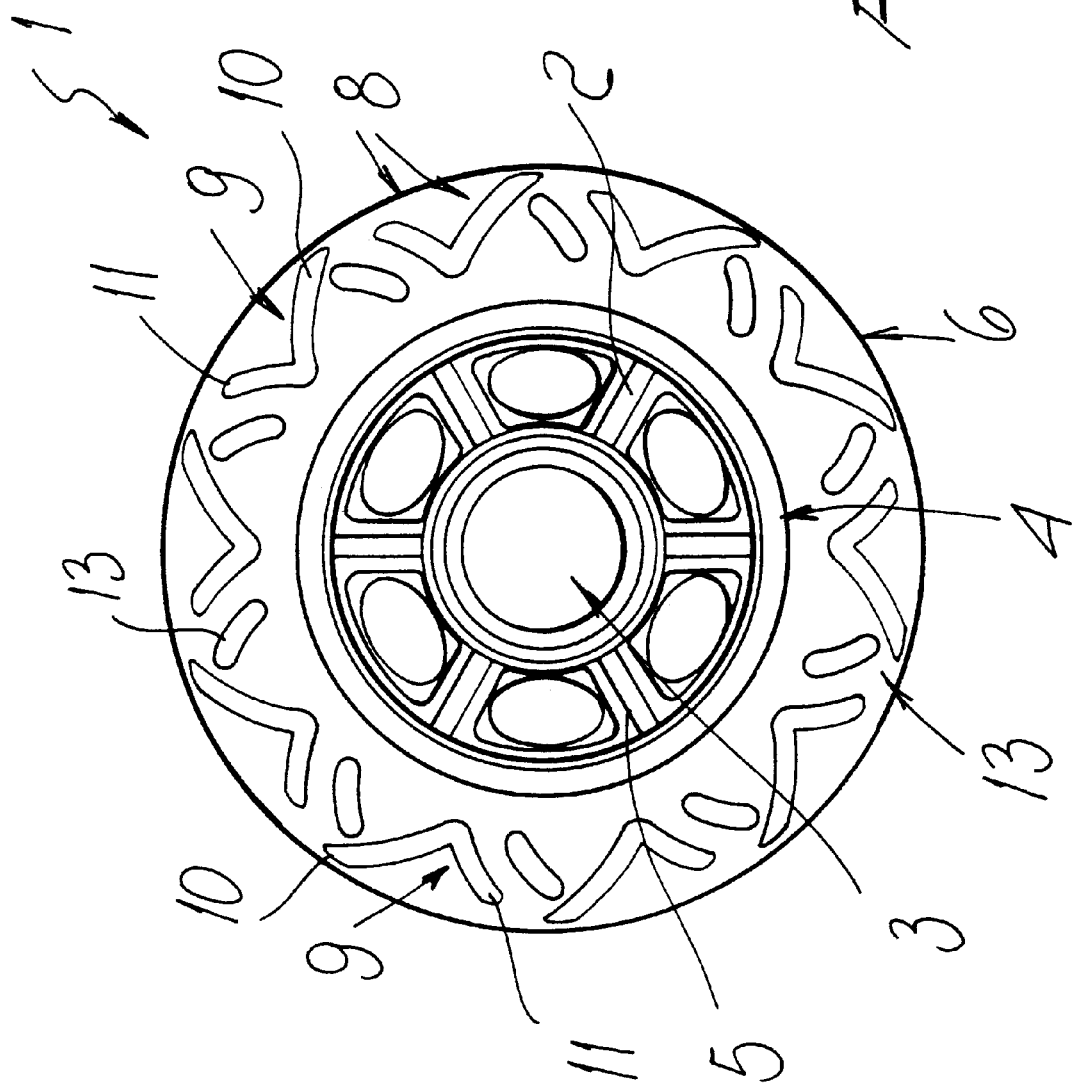

WHEEL, PARTICULARLY FOR ROLLERS SKATES

BACKGROUND OF THE INVENTION

The present invention relates to a wheel which is particularly usable for roller skates, such as in-line roller skates.

The wheels of roller skates are usually constituted by a central hub, made of various materials, which comprises bearings and is rotatably associable at a pivot of the skate frame. A tread is formed on the hub.

In conventional skates it is known to use wheels whose tread is substantially smooth, providing optimum application for skating on smooth and dry surfaces.

U.S. Pat. No. 5,527,100 discloses a composite wheel for in-line skates. The wheel comprises a first central section made of a synthetic plastic material which has a low friction coefficient, and second sections, which are arranged laterally to the first central section and are made of a second synthetic plastic material having a higher friction coefficient.

The above wheel has a higher coefficient of sliding friction of the sides of the wheel on the ground thus improving the braking action which is performed by tilting the skates as in ice-skating. Such wheel construction however does not improve the grip of the wheel while rolling.

This can occur for example during lateral curving, a condition in which the balance of the skater becomes more unstable, especially if the skating surface is slippery or when skating off-road, where the skating surface can be an unpaved road, a wet track, a lawn and in any case a slippery terrain.

As a partial solution to these drawbacks, skates are known which are marketed under the "Spin" trade-name and use wheels which have a plurality of identical and uniformly distributed raised portions at the surfaces of the tread that lie laterally to the central surface.

However, the above wheel ensures a grip which is preset during design as a function of a hypothetical configuration of the skating terrain, which is therefore a compromise among the many situations that the skater may instead encounter.

Moreover, the provision of raised portions or protrusions which rise from the tread leads to another drawback: the protrusions in fact tend to wear rapidly due to friction on the ground, causing the lateral surface of the tread to soon become substantially smooth, with a consequent loss of all advantages in terms of grip.

SUMMARY OF THE INVENTION

The aim of the present invention is to solve the above-mentioned problem, eliminating the drawbacks of the cited prior art, by providing a wheel which allows the skater to maintain a good balance both when the inclination that can be given to the skate during sports practice changes and as a function of the characteristics of the skating terrain.

An object of the present invention is to provide a wheel for skates which allows to achieve an optimum degree of grip as a function of the particular type of terrain on which skating is performed.

Another important object of the present invention is to provide a wheel which allows to increase the degree or ability to expel water or grit present on the ground as grip decreases due for example to the inclination of the wheel with respect to the ground and to the conditions of the ground.

Another object of the present invention is to provide a wheel which is structurally simple and has low manufacturing costs.

This aim, these objects and others which will become apparent hereinafter are achieved by a wheel, particularly for skates, which comprises a hub which is rotatably associable with a pivot and with which a tread is associated, characterized in that one or more grooves are formed in the lateral surfaces of said tread and run gradually in opposite directions with respect to the median plane of said tread.

BRIEF DESCRIPTION OF THE DRAWINGS

Further characteristics and advantages of the present invention will become apparent from the following detailed description of a particular but not exclusive embodiment thereof, illustrated only by way of non-limitative example in the accompanying drawings, wherein:

FIG. 1 is a side view of the wheel;

DESCRIPTION OF THE PREFERRED EMBODIMENTS

Figure 3:
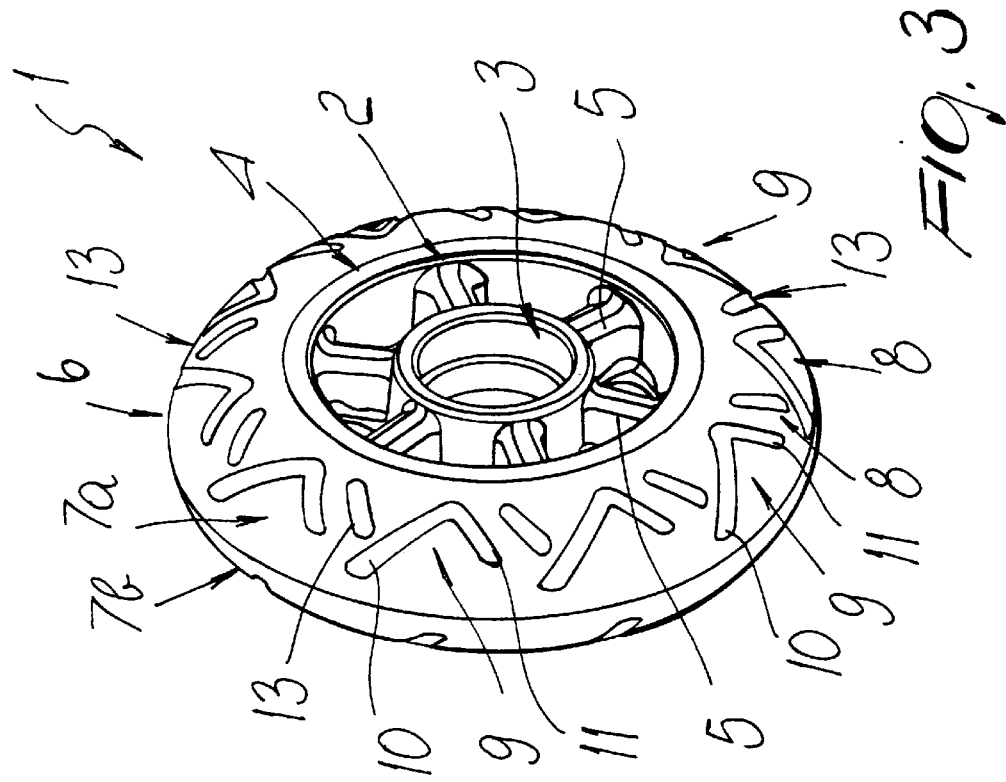
FIG. 3 is a lateral perspective view of the wheel.
Figure 2:
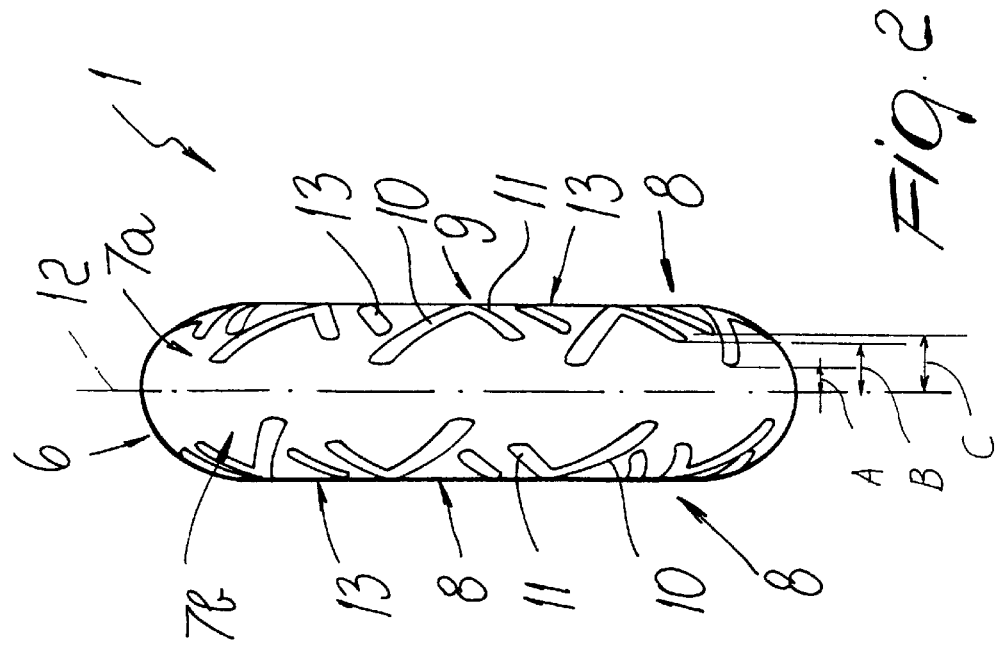
FIG. 2 is a front view of the wheel.

With reference to the above figures, the reference numeral 1 designates a wheel which is particularly useful for skates.

The wheel comprises a hub 2 which comprises a sleeve 3 which forms a seat for bearings and a pivot for pivoting to a frame which constitutes the skate.

An annular surface 4 is provided coaxially to the sleeve 3 and is optionally joined to the sleeve 3 by means of radial fins 5.

A tread 6 is associated with the surface 4, and on the lateral surfaces 7a and 7b of the tread a plurality of grooved regions are provided, generally designated by the reference numeral 8.

In this particular embodiment, a first substantially V-shaped groove 9 is formed in which the vertex is directed toward the sleeve 3 and in which the first wing 10 and the second wing 11 have different lengths, so as to arrange their tips at different distances with respect to the median plane 12 of the tread 6.

In this particular embodiment, the first wing 10 is longer than the second wing 11, so that the free end of the first wing is spaced, with respect to the median plane 12, by a value A which is smaller than the distance, designated by the letter B, between the free end of the second wing 11 and the median plane 12.

The first grooves 9 can be arranged mutually side by side at the lateral surfaces 7a and 7b, and it is possible to provide, in the interspace between two of the grooves, a second groove 13 having a substantially linear, variously curved or straight shape which accordingly again affects the lateral surfaces 7a and 7b and in which the end that is directed toward the median plane 12 is spaced from said plane by an extent C which is greater than the distances designated by the letters B and A of the tips of the first wing 10 and of the second wing 11 of the first grooves 9.

By means of this arrangement, when the wheel is tilted the tip of the first wing 10 of the first groove 9 is the first to interact with the ground. Then, as the inclination increases, the second wing 11 of the first grooves 9 also interacts with the ground. As the inclination further increases, the second groove 13 also interacts with the ground.

It is noted that the particular symmetrical arrangement of the grooves with respect to the median plane 12 allows to mount the wheels equally on the right skate and on the left skate and to mount a wheel on the same skate equally with either orientation.

It has thus been observed that the invention has achieved the intended aim and objects, a wheel having been provided in which a variation in its inclination with respect to the ground also leads to a higher ability of the tread to expel water or grit or dirt, since when the inclination of the wheel increases, and therefore the lateral inclination of the skate also increases, so does the total area of the grooved regions that interact with the ground, thus increasing the grip of the wheel. The total area is in fact determined by the first and second wings of the first groove 9 and by the second groove 13.

Thanks to the particular configuration of the first and second grooves, and therefore of the possibility to gradually affect them as the inclination of the wheel varies, it is possible to maintain a high grip also in different operating conditions of the skate both in terms of wheel inclination and as a function of the configuration of the skating terrain and therefore on rough terrain or on terrain made slippery by the presence of water or moisture.

If water is present, the configuration of the first and second grooves allows to increase the ability to expel water as the grip due to the inclination of the wheel and to the conditions of the ground decreases.

The wheel according to the invention is susceptible of numerous modifications and variations, within the scope of the appended claims.

Thus, for example, the number and shape of the grooves, as well as their depth, cross-section and arrangement, may be varied according to specific requirements.

The materials and the dimensions that constitute the individual components of the wheel may of course also be the most pertinent according to specific requirements.

The disclosures in Italian Patent Application No. TV98A000088 from which this application claims priority are incorporated herein by reference.

What is claimed is:

1. A wheel for skates, comprising a hub having a tread, grooved regions being formed in the lateral surfaces of said tread and extending gradually in opposite directions with respect to the median plane of said tread, said grooved regions comprising separate first grooves which are substantially V-shaped and having a vertex being directed toward said hub, a first wing and a second wing being formed in said first grooves and having mutually different lengths, so as to arrange their tips at difference distances with respect to the median plane of said tread, said first wing being longer than said second wing, so that the free end of said first wing is spaced, with respect to said median plane, by a first distance (A) which is shorter than a second distance (B) between the free end of said second wing and said median plane, said first grooves being arranged side by side at said lateral surfaces and being mutually equidistant, at least one second groove being formed in the interspace between two of said first grooves.

2. The wheel according to claim 1, wherein said at least one second groove has a configuration which affects said lateral surfaces and in which the end directed toward said median plane is spaced from said median plane by a third distance (C) which is longer than the first and second distances of the tips of said first and second wings of said first grooves.

3. The wheel according to claim 1, wherein said first and second wings of said first groove and said second groove determine a total area.

4. The wheel according to claim 3, wherein as the lateral inclination of said wheel increases, the portion of said total area that interacts with the ground increases.

5. The wheel according to claim 1, wherein the arrangement of said first grooves and of said at least one second groove are symmetrical with respect to said median plane.

* * * * *